Oct. 16, 1923.

A. McL. NICOLSON 1,470,696

TELEVISION

Filed Dec. 7, 1917   3 Sheets-Sheet 1

Inventor:
Alexander McLean Nicolson.
by [signature] Att'y.

Oct. 16, 1923.

A. McL. NICOLSON

TELEVISION

Filed Dec. 7, 1917

Inventor:
Alexander McLean Nicolson.
by ⟨signature⟩, Atty.

Patented Oct. 16, 1923.

1,470,696

UNITED STATES PATENT OFFICE.

ALEXANDER McLEAN NICOLSON, OF NEW YORK, N. Y., ASSIGNOR TO WESTERN ELECTRIC COMPANY, INCORPORATED, OF NEW YORK, N. Y., A CORPORATION OF NEW YORK.

TELEVISION.

Application filed December 7, 1917. Serial No. 205,993.

*To all whom it may concern:*

Be it known that I, ALEXANDER McLEAN NICOLSON, a subject of the King of Great Britain, residing at New York, in the county of New York and State of New York, have invented certain new and useful Improvements in Television, of which the following is a full, clear, concise, and exact description.
This invention relates to means and methods for transmitting and receiving views, visible records and pictures of objects.

The transmission of pictures over wires and their reproduction at a receiving station is not unknown in the art. In general the method employed at the transmitting station has been to scan successively the elementary portions of the object under consideration and to create electrical impulses proportional to the intensity or color of the light emitted by these successive elements of the object. It has been found preferable to use oscillating or rotating mirrors for the scanning of the elementary portions of the object. These mirrors are suitably placed to reflect the light received by them from the object to a light sensitive substance capable of transforming the incident light into the desired electrical impulses. After being transmitted to the receiving station these impulses serve to vary correspondingly the intensity of a light beam which is incident upon a suitable receiving screen or plate. This above mentioned apparatus comprises what may be called the analyzing means. In order that the picture at the receiving station may be a faithful reproduction of the object at the sending station, it is necessary that the light beam at the receiving station should traverse a path which corresponds at every instant of time with the path at the sending station as made up by the elementary patches successively scanned by the mirrors,—that is, means must be provided for synchronizing the mirrors at the transmitting and receiving stations. Such an apparatus may be called a synchronizing means.
In employing this method for the transmission of pictures of moving objects, it is necessary that the object at the transmitting end be scanned a sufficient number of times per second to provide for the apparent continuous reproduction of the picture on the receiving screen, so that the observer's eye can detect no time lag or flicker. This would demand, for moving objects, that the object should be scanned and reproduced at least eighteen to twenty times per second.

The purpose of this invention is to provide a simpler and more effective means than has hitherto been known for the analysis, transmission, and reproduction of pictures of objects.

The word "television" as used in this specification will mean the seeing of animate or inanimate objects at a distance.

For the accomplishment of this purpose this invention embodies a mirror upon which are impressed oscillations of a single frequency. Actuated by these oscillations, the mirror is constrained to scan the elementary portions of the object with the desired frequency. The light received from these portions by the mirror is transformed by a light sensitive substance into electrical oscillations of corresponding intensity. After amplifying these oscillations without distortion they are transmitted in a suitable manner to the receiving station, where means is provided for varying the intensity of a light beam in accordance with said oscillations. Associated with the mirror at the sending station is a second light sensitive substance so situated that a beam of light of constant intensity reflected from said mirror to said substance varies its point of incidence upon said substance according to the oscillations of said mirror. This light sensitive substance, by means of a construction hereinafter described in detail, produces electrical impulses that at every instant of time are a function of the position of the point of incidence of said light beam. These electrical impulses, which are proportional to the oscillations of the mirror, are transmitted to the receiving station, where, by a construction to be described later, the light beam above-mentioned is constrained to move in a path synchronous and analogous with the path formed by the successive elementary portions or patches scanned by the mirror.

The preferable method for transmitting the analyzing and synchronizing oscillations is by apparatus used for radio communications. At the transmitting station, a generator of high frequency oscillations is provided. These high frequency oscillations are employed to serve as the carrier wave oscillations for the analyzing and synchronizing oscillations by providing a modulator whereby the high frequency may be modulated in accordance with the two lower frequencies. At the receiving station these modulated oscillations are detected and by means of suitably tuned circuits the analyzing and synchronizing oscillations may be separated and led to the desired terminals.

It is to be understood, however, that this invention is not limited to a system in which radio transmission is employed, but the transmission of the analyzing and synchronizing currents may be by wire as well.

For the better understanding of this invention reference is made to the accompanying drawings, in which Fig. 1 illustrates the transmitting station of one embodiment of this invention; Fig. 2 indicates the plan arrangement of five of the elements of Fig. 1; an additional circuit for the transmitting station is shown in Fig. 3; Fig. 4 is a modification of Fig. 3; Fig. 14 represents a modification of Fig. 13. In the drawings beside each audion tube shown is a letter indicating the function which the particular tube performs. Thus "A" indicates that the tube is an amplifier; "D" indicates a detector; "M" a modulator; and "G" an oscillation generator.

Figures 1, 2, 3, 4:
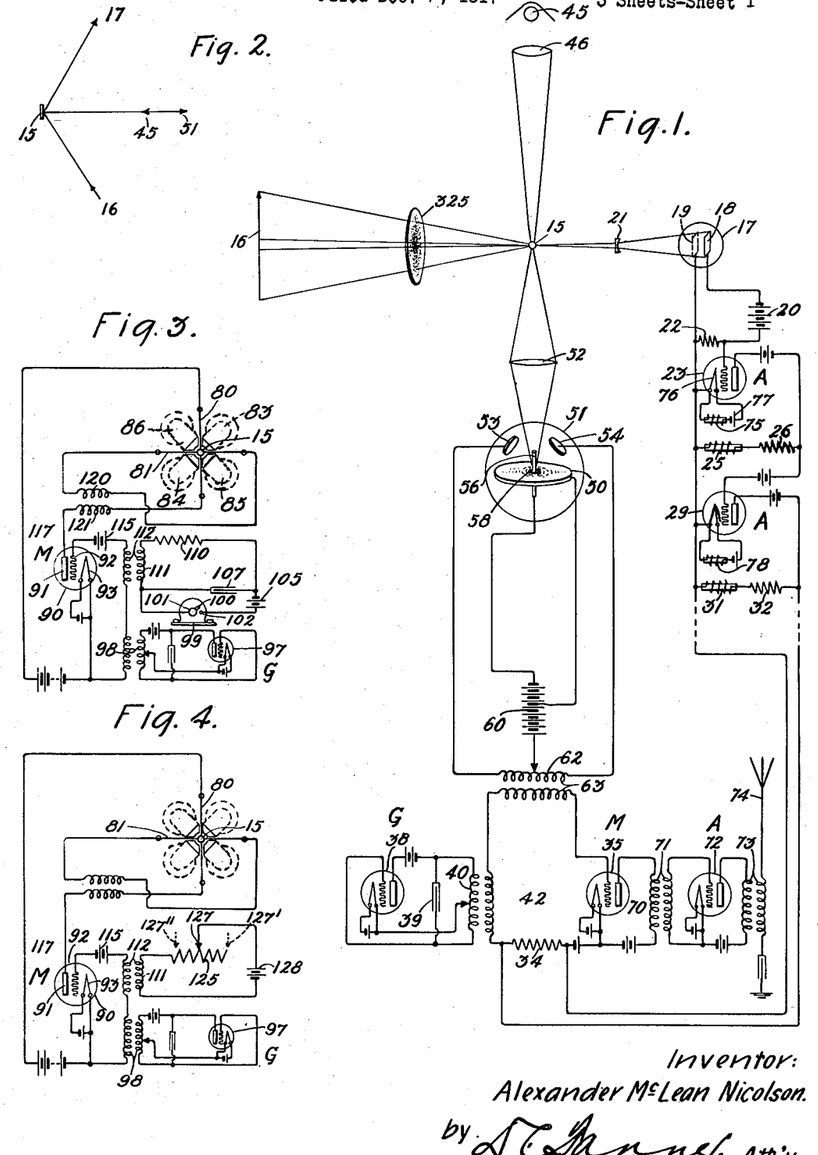

In the transmitting system of Fig. 1, 15 is a mirror adapted to scan the object 16. Interposed between said mirror and the object is a partially transparent disc 325, the purpose of which will be hereinafter described. The light received by said mirror is reflected to a suitable light sensitive substance shown here as a photo-cell 17, where it strikes the light sensitive cathode 18. 21 is a diverging lens for distributing the light over the cathode 18 in a suitable manner. As the mirror oscillates in a manner to be hereinafter described, the light received from the successive elementary portions of the picture or object are reflected to the photo-cell. This light will allow a current to flow between the electrodes 18 and 19 of the cell from the battery 20, and the current produced will at every instant be proportional to the light received by said mirror from the successive areas of the object being scanned. The drop of potential produced by this current flow across the terminals of the resistance 22 is impressed upon the amplifier 23. The amplified currents across the choke coil 25 and resistance 26 are impressed on a second amplifier 29. The amplified voltages across the terminals of the choke coil 31 and resistance 32 may be further amplified or they may be, as shown, impressed upon the resistance 34, which is located in the input circuit of the modulator 35, which is preferably of the audion type. In order that the currents from the photo-cell 17 may be amplified without distortion, it is preferable that the amplifiers 23 and 29 should be of the audion type. The evacuated vessel 38 and its allied circuits, taken in connection with the capacity 39 and inductance 40, constitute an oscillation generator of the type described by Hartley, in his U. S. Patent No. 1,356,763, for oscillation generators, patented October 26, 1920. High frequency oscillations from this generator are impressed on the input circuit 42 of the modulator 35, where they are modulated in accordance with the photo-current fluctuations. Such a modulation scheme is similar to the one disclosed by Van der Bijl, in his U. S. Patent No. 1,350,752, for high frequency signaling, patented August 24, 1920.

These high-frequency oscillations are also modulated by oscillations which serve to synchronize the movement of the mirror 15 and the reproducing means at the receiving station. In order to provide these synchronizing currents, a source of steady light 45 is provided, which may be of any character, for emitting suitable light of constant intensity. The light from said source passing through the converging lens 46, strikes the mirror 15 and is reflected to the light sensitive cathode 50 of the photo-electric cell 51, after passing through the converging lens 52. This photo-electric cell has two anodes, 53 and 54, preferably situated opposite each other, and an auxiliary electrode 56, which is shown to be in the center of the cathode 50 and insulated therefrom by the insulation material 58. The battery 60 is so connected to these electrodes that the auxiliary electrode 56 is more negative than the cathode 50, with respect to the anodes.

The action of the device 51 may be explained as follows: It is well known in the art that a negatively charged body near an electron-emitting electrode will decrease the electron flow, the amount of the decrease depending upon the proximity and the amount of the charge. Now, the spot on the cathode 50 where the light falls will depend upon the position of the oscillating mirror. And as the light sensitive cathode will emit electrons only at the spot where the light is incident, then the elementary area emitting the electrons will be at a different distance away from the auxiliary electrode 56 at each instant of time. It follows then that the electron current to one or both of the anodes will vary in accordance with the distance between the auxiliary electrode and the point where the light strikes the cathode, which distance will vary in consequence of the oscillations of the mirror 15. Therefore, the current flowing through the coil 62 of the transformer 63, corresponds at every instant of time with the position of the scanning mirror. By means of this transformer 63 these currents are impressed upon the input circuit of the modulator 35. It follows then, that the high-frequency oscillations from the oscillator 38 are modulated in accordance with both the analyzing currents from the photo-cell 17, and synchronizing currents from the photo-cell 51. The modulated high-frequency oscillations in the output circuit 70 are impressed, by means of transformer 71, upon the input circuit of the amplifier 72. The amplified and modulated high-frequency oscillations may then be further amplified by additional amplifiers, or they may be impressed upon suitable transmitting terminals. In this drawing they are shown to be impressed by transformer 73 upon a transmitting antenna 74.

The choke coil 75, which is connected to the filament 76 of the amplifier 23, is inserted in the filamentary circuit to prevent any sudden fluctuations of the current flowing therein due to small change in the electromotive force of the battery 77. The choke coil 78 associated with the amplifier 29 serves a similar purpose.

It is to be noted that the system explained above is applicable in the case where the object is either illuminated by direct light or intermittent light or both, since there are no transformers located between the photo-cell 17 and the modulator 35. With this arrangement, and with the object illuminated by steady light alone, the frequency of the electrical impulses from the photo-cell may be either small or large, depending on the contrast in the object being scanned. Transformers, therefore, should be absent in order to insure efficient transmission of the low frequency impulses. If, however, the object is illuminated by intermittent light of a high frequency, say 30,000 to 50,000 cycles per second, transformers could be used instead of the direct connection illustrated.

Although the device 51 is shown in its preferred form, it may be variously modified, and still perform its proper function. The two anodes may be of any desired size and shape suitably located with respect to the photo cathode. The device is also operative when the auxiliary electrode is made more positive than the cathode, instead of more negative. The cathode of this device, as well as the cathode of the cell 17, may be coated with any of the light sensitive materials known in the art, such as the alkali metals. Potassium or rubidium in rarified neon gas forms a particularly sensitive cathode.

Fig. 2 shows in plan how the mirror 15 of Fig. 1 may be arranged to reflect light from the object 16 and the source 45 to the photo-electric cells 17 and 51, respectively. One form of the apparatus, by which the mirror may be constrained to oscillate so that the object may be scanned, is shown in Fig. 3. The mirror 15 is shown supported on two wires 80 and 81, which are situated in the magnetic field produced by the four poles 83, 84, 85 and 86 of two electromagnets, two of which poles may be north poles, and two south poles. The arrangement and the structure of this magnetic field will be hereinafter described. 90 is an evacuated vessel of the audion type containing an anode 91, a grid 92, and a filament 93. 97 is a high-frequency oscillation generator of a type similar to the one designated by the reference character 38 in Fig. 1. Oscillations from this generator are impressed upon the input circuit of the device 90 by the transformer 98. 99 is a motor which has a brush 100 on its armature 101, which brush once every revolution makes contact with the point 102, whereby the circuit containing a battery 105 is made and broken a definite number of times per second. When the circuit is made the condenser 107 becomes charged. Substantially no current can flow through the resistance 110 and inductance 111 during the brief interval the brush makes contact, owing to the high impedance of this path to the suddenly applied voltage. But when the battery circuit is broken the condenser discharges through the resistance 110 and the inductance 111, which inductance acts as the primary winding of the transformer 112. The resistance 110 of this circuit is of large enough value to dissipate the energy during a single half wave so that a single damped impulse results from each discharge. The time required for such discharge may be of any desired value, as it depends only upon the value of the resistance, capacity and inductance of the circuit. 115 is a battery for supplying voltage to the grid 92. It is well-known in the art that the space current between the filament 93 and the plate 91, due to the space current source, may be brought to zero by applying sufficient negative voltage to the grid 92. Assume that the space current source is of such a value that there is no space current in the tube 90 when the condenser is not discharging; that is, assume that the algebraic sum of the voltage of the space current source and the maximum positive value of the oscillations from the generator 97 is just below the critical value at which the space current source can cause an electron stream to flow from cathode 93 to anode 91. The discharge of the condenser 107, when it occurs, will be in such a direction that it will make the grid 92 more positive, thereby bringing the potential of the grid above the critical value for space current, thereby allowing the current to flow. The variation component of this space current in the output circuit will correspond in form to the high-frequency oscillations from the generator 97; and at each instance of time the amplitude of the oscillations will be proportional to the current discharge from the condenser, and as the discharge of the condenser will pass in an approximately linear manner from a maximum to a zero value, so the oscillations in the output circuit 117 of the device 90 having the frequency of the oscillations of the generator 97, will vary in amplitude from a maximum to a zero value. These currents will pass directly through the wire 80 which is included in the output circuit 117. Due to the fact that this wire carrying an electric current is in a magnetic field, the wire will perform mechanical oscillations of a simple harmonic nature. The supporting wire 81 will also receive these currents on account of the inductive coupling between the coils 120 and 121. These induced currents will also produce mechanical oscillations of the wire 81, which wire is at right angles to the wire 80; but owing to the fact that the currents in wire 81 are by induction, they are ninety degrees out of phase with those in wire 80. Hence, the mirror 15 is acted upon by two simple harmonic motions at right angles to each other, and having a phase difference of ninety degrees. Since the result of two such simple harmonic motions is a circle, it is evident that, providing the amplitude of the oscillations were constant, the mirror 15 would scan the object in a circle of constant radius. But, as the amplitude varies from a maximum to a zero value, due to the condenser discharge as previously described, the mirror will scan the object in a spiral path which will be repeated every time the condenser discharges. The character of this path will hereinafter be described more in detail.

It is evident that any suitable source of oscillations may be used other than the particular type illustrated. This invention is not limited to the disclosed method of making and breaking the condenser circuit, as it may be done in any convenient manner.

As the motor may have any desired speed, the condenser may be charged the proper number of times per second, in order to have the mirror scan the object at the proper frequency, which, in general, will be approximately twenty times per second.

Fig. 4 illustrates another method by which the mirror may be constrained to undergo the desired oscillations. The apparatus is similar to that of Fig. 3, except that the current through a variable resistance 125 has been substituted for the discharge of a condenser as a means for determining the flow of current through the wires supporting the mirror 15. When the adjustable contact 127 is in the position 127', the resistance is in series with the battery 128, thereby reducing the current to a minimum. The maximum current, of course, will flow when this resistance is not included in the circuit; that is, when the contact is in the position 127''. If now, some suitable means (not shown) is provided for moving the contact back and forth between the two points 127' and 127'', the current through the winding 111 of the transformer 112 will vary alternately from a maximum to a minimum value, and from a minimum to a maximum value. These undulations will be impressed on the input circuit of the device 90, and, as explained above, under the description of Fig. 3, will cause corresponding variations in the space current between the filament 93 and the anode 91. In this case, however, the mechanical oscillations will decrease in amplitude from a maximum to a minimum value, and then increase from a minimum value back to the maximum value, and so on. Oscillations of such a character impressed on the mirror will cause it to trace a spiral path having the diameter of its spires decreasing with respect to time from a maximum value to a zero, and then increasing from zero back to maximum again. The character of such a curve will be hereinafter described.

Figure 5:
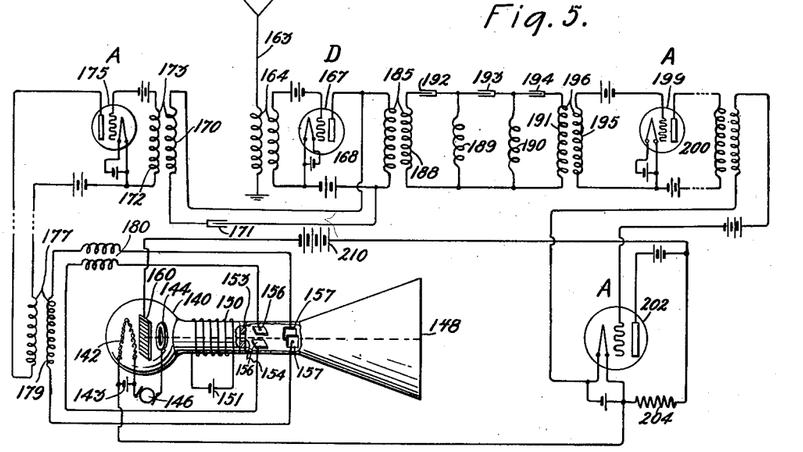
Fig. 5 illustrates one embodiment of the receiving system of the invention.

Fig. 5 illustrates a receiving system adapted to reproduce the picture of the object being scanned by the mirror at the sending station. To accomplish this reproduction a cathode ray tube 140 of the type usually designated as a Braun tube, may be employed. 142 is a cathode for said tube, heated by the source of current 143; 144 is an anode, shown here in the form of a ring. The source of direct current voltage 146 is of such strength that the cathode ray stream from the cathode 142 is projected through the anode to the other end of the tube where a suitable screen 148 is located, which is adapted to have reproduced upon it the picture transmitted from the sending station. A translucent screen which fluoresces under the action of cathode rays may be employed. As it is desirable to have the cathode stream in the form of a narrow beam, a solenoid 150 with a source of current 151 is wound around the neck of the tube by means of which solenoid the beam may be concentrated. In order to insure further the narrowness of the beam, a stop 153 is provided, having a small aperture 154, through which the rays may pass. In order to provide means for deflecting this beam, so that the beam will describe a path on the fluorescent screen corresponding to the path formed by the successive elementary areas of the object scanned by the oscillating mirror, two pairs of condenser plates 156 and 157 are provided. The plates 156, 156 are parallel to each other, and their surfaces are in planes perpendicular to the plane of the drawing. The plates 157, 157 are parallel to each other, and located at right angles to the plates 156, 156,—that is, the planes of the plates 157, 157 are parallel to the plane of the drawing. A grid 160 is provided for controlling the intensity of the cathode rays.

In order to supply the plates 156, 156 and 157, 157 with charges proportional to the synchronizing oscillations and to supply the grid 160 with charges proportional to the analyzing oscillations from the sending station, an antenna 163 is provided for receiving the high-frequency oscillations modulated in accordance with the analyzing and synchronizing currents. By means of the transformer 164 the modulated oscillations are impressed upon the detector 167, so that the output circuit 168 contains oscillations of analyzing frequency and oscillations of synchronizing fequency. That part of the output circuit containing the inductance 170 and the capacity 171 is tuned so that the secondary coil 172 of the transformer 173 will receive oscillations of only the synchronizing frequency. These synchronizing oscillations, after amplication by the amplifier 175, may be further amplified, or, as shown, they may be impressed upon the transformer 177. The oscillations in the coil 179 will be impressed upon the two plates 157 and 157. In the circuit of coil 179 is the primary of a transformer 180, the secondary of which is connected to the plates 156, 156. It follows therefore, owing to the inductive relation through the transformer 180 of the circuit containing the plates 156, 156, and the circuit containing plates 157, 157, that the two pairs of plates will have oscillations impressed on them of the same frequency but having a phase difference of ninety degrees. The cathode ray beam will then be moved up and down in a plane corresponding to the plane of the drawing according to the charges on these latter-mentioned plates. Likewise the charges on the plates 157, 157 will move the beam in the plane perpendicular to the above mentioned plane. But the potential of these four plates is proportional to the synchronizing currents at the sending station. It follows that two simple harmonic motions at right angles to each other, and having a phase difference of ninety degrees, will be impressed on the cathode beam, and that these simple harmonic motions will be analogous and synchronous with the two simple harmonic motions impressed upon the scanning mirror at the sending station. The cathode ray beam will, therefore, describe a path on the fluorescent screen corresponding to that taken by the mirror at the sending station.

By means of the transformer 185 the oscillations in the output circuit 168 of the detector are impressed upon a wave filter of suitable form herein shown as comprising the inductances 188, 189, 190 and 191, and the capacities 192, 193 and 194. Such a wave filter is described by Campbell in his U. S. Patent No. 1,227,113, granted May 22, 1917. As in general the analyzing frequency will be greater than the synchronizing frequency, it is preferable that the electrical constants of the filter should be such as to eliminate the synchronizing frequency, and to transmit all frequencies above that value. If we assume that such is the case, then the secondary coil 195 of the transformer 196 will receive oscillations of only the analyzing frequencies. These will be impressed upon the amplifier 199. The amplified oscillations in the output circuit 200 may be amplified further by being impressed upon a second amplifier 202. Any desired amplification may be produced by inserting additional amplifiers. It is preferable, however, that the output circuit of the last amplifier should have a resistance 204 inserted in it. The drop of potential across the terminals of this resistance may then be impressed upon the grid 160 of the cathode ray tube. The potential of the grid will then vary in accordance with the analyzing current, so that the intensity of the cathode stream will at each instant be proportional to the intensity of the light received by the mirror from the object being scanned. It follows then, as the beam is caused to follow a path on the fluorescent screen corresponding to the path scanned by the mirror that at each instant the intensity of the illumination on each elementary area of the screen will be proportional to the intensity of the light emitted by the corresponding elementary area of the object. The picture will, therefore, be reproduced every time the mirror completely scans the object at the receiving station.

It is preferable that the negative potential supplied to the grid by the battery 210 should be just below the minimum potential for which the space current source can cause an electron stream to flow from cathode 142 to anode 144. There will, therefore, be darkness on the screen 148 when the potential of the grid is due to the battery 210 alone, but when the amplified analyzing impulses are impressed upon the grid, cathode rays will be radiated to the screen, having an intensity at each instant proportional to these amplified impulses.

This invention is not limited to a cathode ray tube of the type as shown, but the tube may be of any suitable type, and the rays may be of any kind that may be deflected electrically. The grid in the cathode ray tube, although shown to be located between the filament and the anode, may also be placed on the side of the filament away from the anode. Although the deflection of the beam is shown to be accomplished by electrostatic means, it may be done electromagnetically as well, by means of suitably placed electro-magnets.

If the object being viewed by the mirror at the receiving station is moving, it is necessary that the object be scanned at least eighteen to twenty times per second in order to provide for continuity in the images received by the eye of the reproduced picture on the screen. If we assume that the object could be satisfactorily scanned in fifty or sixty spires, it would follow that the synchronizing frequency would be in the neighborhood of 1000 cycles per second. Should the object be illuminated by intermittent light, its frequency, in order to avoid confusion with the synchronizing frequency, should be considerably greater, say in the neighborhood of 10,000 cycles per second. The carrier wave frequency for such oscillations would preferably be still higher, namely 50,000 or 100,000 cycles per second, for example.

Figure 6:
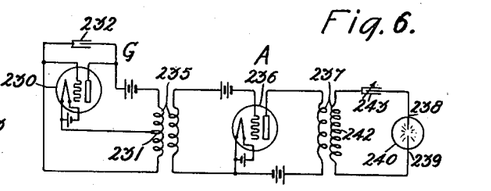
Fig. 6 illustrates a device for illuminating the object by intermittent light when desired.

Fig. 6 illustrates a means by which the object may be illuminated by intermittent light. The vacuum tube 230 and its allied circuits, taken in connection with the inductance 231 and the capacity 232, comprises an oscillation generator similar to the type described in Figs. 1, 3 and 4. Oscillations from this generator, by means of transformer 235, are impressed upon the amplifier 236. The amplified oscillations in the output circuit of the amplifier may be amplified in voltage by a step-up transformer 237 before being impressed upon the two electrodes 238 and 239 situated in the vessel 240. In order to insure that the frequency of the discharge between said electrodes will be constant and equal to the frequency of the generator 230, a capacity 243 is inserted in the circuit containing the electrodes and the secondary 242 of transformer 237, so that the circuit may be turned to the desired frequency. The object whose image is to be transmitted may then be exposed to the light from the discharge between the electrodes.

The vessel may contain any gas or mixture of gases of any desired pressure, in order that the object may be properly illuminated. The oscillations may be derived from any suitable generator and may be amplified to any degree desired.

Figure 7:
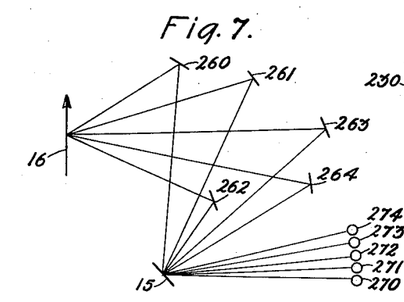
Fig. 7 illustrates one means for increasing the total amount of photoelectric current transmitted.

Fig. 7 illustrates how a plurality of photo-cells may be employed to receive light from the object being scanned, in order to increase the magnitude of the total photo-electric current impressed on the input circuit of the first amplifier. The oscillating mirror 15, instead of receiving light directly from the object 16, receives it by means of the reflecting mirrors 260, 261, 262, 263, and 264, respectively. The light received by the oscillating mirror from the reflecting mirror 260 strikes the cathode of the photo-electric cell 270. The light from the reflecting mirror 261 is incident upon the cell 271. The cell 272 receives light reflected from the mirror 262; cell 273 from the mirror 263; and cell 274 from mirror 264. With such an arrangement any desired number of reflecting mirrors and photo-cells may be employed to strengthen the photo-electric current generated. This system of photo-electric cells 270 to 274 inclusive may be substituted if desired for the photo-electric cell 17 of Fig. 1. These photo-cells may have the same characteristics or may be of different characteristics. Thus they may be sensitive to light from different portions of the spectrum. Some, for example, may be sensitive only to the visible portion of the spectrum, while others may be sensitive to ultra-violet light. By making use of all the wave lengths reflected by the scanning mirror a maximum photo-current may be built up.

Figures 8, 9:
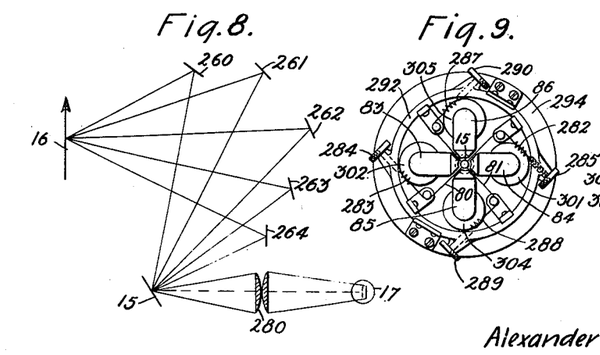
Fig. 8 is a modification of Fig. 7.
Fig. 9 is a diagrammatic sketch of an apparatus that may be used in the transmitting system.

Another method of strengthening the photo-currents is illustrated in Fig. 8. As in Fig. 7, the light received from the object by the five mirrors 260 to 264 inclusive is reflected to the scanning mirror 15. Instead of having the rays separate after striking said scanning mirror, and being incident upon different photo-electric cells, they are concentrated by means of a condensing lens 280 upon a single photo-cell, which may, if desired, be the photo-cell designated by the numeral 17 in Fig. 1. Any desired number of reflecting mirrors may be employed to produce the desired strength of the photo-electric currents.

Fig. 9 illustrates partly in cross-section and partly in perspective, an apparatus by means of which the oscillating mirror may be suitably supported in the magnetic field. 15 is a mirror which is supported by and fastened to the point of intersection of the two wires 80 and 81. In order to provide proper tension on the wire 80, two coiled springs 282 and 283, and two thumb screws 284 and 285 are provided, by means of which any desired tension may be exerted upon said wire. Similarly, in order to insure the proper tension on wire 81, two coiled springs 287 and 288, and two thumb screws 289 and 290 are provided. The four thumb screws are supported by a ring 292, which is fastened to the base piece 294. 301 and 302 are the two coils of an electromagnet having the two pole pieces 83 and 84. 304 and 305 are the two coils of another electro-magnet having the two pole pieces 85 and 86 respectively. The pointed ends of these pole pieces are in close proximity to the mirror 15.

Figure 10:
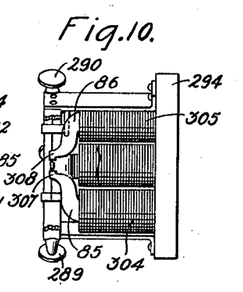
Fig. 10 is a side view of the same.

Fig. 10 illustrates a side view of the device of Fig. 9, with part of the apparatus torn away, in order to show more completely the arrangement of the pole pieces around the mirror. The various parts have the same reference characters as in Fig. 9. The curved nature of the pole pieces 85 and 86 is brought out more clearly in this figure, where the two ends 307 and 308 are shown to be hooked and pointed, so as to make of greater strength the magnetic field around the mirror and its supporting wires.

Figure 11:
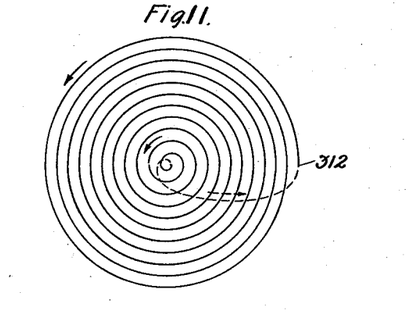
Fig. 11 shows one of the paths along which the mirror may scan the object.

Fig. 11 illustrates a path the oscillating mirror would follow in scanning the object, if it received its oscillations from a system similar to the one illustrated in Fig. 3. The mirror will be at the point 312 when the oscillations supplied to it are at maximum amplitude. As the amplitude of the oscillations gradually dies down to zero according to the discharge of the condenser 107 of Fig. 3, the mirror will follow spires of smaller and smaller diameter until it has reached the center of the spiral, when the amplitude of the oscillations will become zero. As soon as the condenser begins to discharge again, the mirror rapidly follows a path from the center of the spiral to the point 312 by some such a path as is shown as a dotted curve in Fig. 11.

Figure 12:
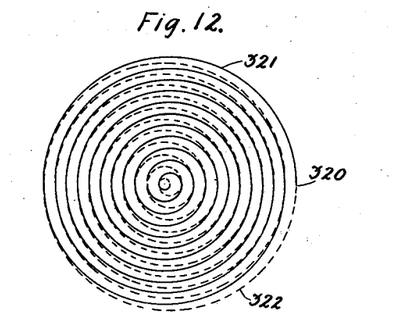
Fig. 12 illustrates another path which the mirror may follow.

Fig. 12 illustrates a path the oscillating mirror would take in scanning the object, if the oscillations impressed on it are derived from a system similar to the one illustrated in Fig. 4. The mirror will be at the point 320 when the oscillations supplied to it are at the maximum amplitude. Since the amplitude of the oscillations gradually dies down to zero as the contact 127 passes from the point 127'' to 127', the mirror will trace out spires of smaller and smaller diameter until it reaches the center of the spiral. This path is shown by the full line 321. Now, as the contact 127 moves from the point 127' back to the position 127'', the oscillations supplied to the mirror will gradually increase from zero to maximum amplitude, so that the mirror will trace out spires of increasing diameter until the point 320 is reached again. Its path for oscillations of increasing amplitude is shown by the dotted line 322. The scanning process outlined above may be repeated as rapidly as desired.

Figure 13:
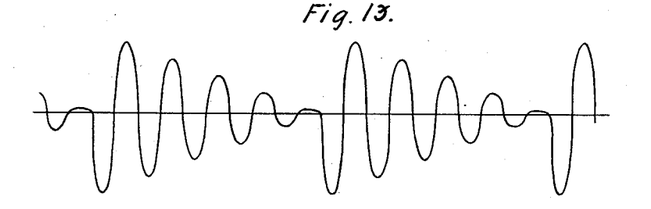
Fig. 13 illustrates one form the oscillations impressed on the scanning mirror may possess.

Fig. 13 shows the character of the oscillations supplied to the mirror when it is being oscillated by the system illustrated in Fig. 3. As explained above, under the description of Fig. 11, this curve shows that the oscillations periodically decrease in approximately a linear manner from a maximum amplitude down to zero. Horizontal distances indicate time, and vertical distances represent the amplitude of the oscillations.

Since the mirror will trace a complete spire in the same length of time as required for one complete oscillation from the generator 97 of Fig. 3, it follows that the angular velocity of the mirror will be the same for the entire spiral. Owing however, to the fact that the spires are of different diameters the linear velocity of the mirror will not be constant. It is apparent that the linear velocity near the outer portion of the spiral will be considerably greater than the velocity for the central portion of the spiral. Consequently there will be a constant decrease in the linear velocity of the mirror as it passes from the point 312 to the center. This would mean that the scanning mirror would receive light for a greater length of time from the elementary portions near the central part of the object than from the rest of the object. Consequently at the receiving station the central portion of the picture would be produced brighter than it should be for a faithful reproduction. In order to insure a faithful reproduction of the picture a compensating means 325 may be employed at the sending station to correct the unnatural increase in the amount of light above mentioned. As illustrated in Fig. 1, this compensating means may be a disc of quartz or glass or other suitable material marked or coated in such a manner that while transparent at its outer edge it becomes less and less transparent on passing to its center. The graduation in transparency necessary to make the proper correction may be readily determined by experiment.

Figure 14:
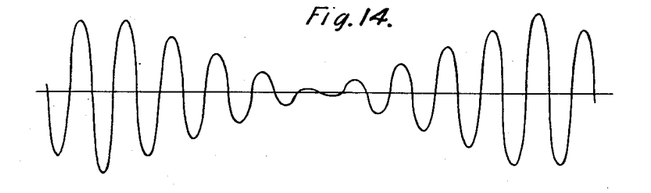

Fig. 14 illustrates the character of the oscillations supplied to the mirror when the apparatus of Fig. 4 is employed. As stated under the explanation of Fig. 12, the oscillations decrease linearly from a maximum amplitude to zero, then linearly increase to maximum again, and repeat the process. Horizontal and vertical distances represent the same functions as in Fig. 13.

From the above detailed description it is obvious that the system may be employed to transmit pictures of animate as well as inanimate objects. Of course, in the case of stationary objects such as outdoor scenes, pictures, printed matter and the like, it is not necessary to have the mirror scan the object as rapidly as twenty times per second, but the number may be considerably less. With rapidly moving objects, however, the number should be somewhat greater.

It is apparent that various changes may be made in the above described system for television without departing in any wise from the spirit of the invention as set forth in the appended claims.

What is claimed is:

1. The method of television comprising transmitting an image having light intensity variation in at least two directions by means of a single carrier wave.

2. The method of television which consists in transmitting a single carrier wave modulated in accordance with the elements of an image area having characteristic variations in more than one direction.

3. The method of television which comprises analyzing an image into elementary portions and modulating a carrier wave in accordance with the space and intensity characteristics of each of said portions.

4. The method of transmitting an image which comprises analyzing said image into elementary areas, producing a train of energy varying according to the intensity characteristics of said areas, and producing another train of energy varying according to the position characteristics of said areas.

5. The method of transmitting an image which comprises analyzing an image into elementary areas, producing a train of energy varying in accordance with the intensity characteristics of said areas, and another train of energy varying according to the position characteristics of said areas, transmitting and receiving energy corresponding to that of said trains and causing said received energy to reproduce said image.

6. In a system for the transmission of pictures, the method which comprises causing a beam of light to oscillate at the transmitter, causing an electric current to vary in accordance with the oscillations of said beam, transmitting energy varying in its characteristics in accordance with those of said current and causing said transmitted energy to oscillate a beam of energy at a receiving station.

7. In television, the method comprising causing a beam of light of constant intensity to oscillate, varying an electric current in accordance with the amplitude and frequency of the oscillations of said beam, transmitting energy varying in its characteristics in accordance with those of said current, and causing a beam of energy at a receiving station to move in accordance with characteristics of said transmitted energy.

8. In television, the method comprising utilizing a scanning element to scan an image to be transmitted and causing said scanning element to register its position by varying the amplitude of an electric current.

9. In a system for the transmission of pictures of objects, the method of synchronizing receiving and transmitting stations, which consists at the transmitting station in oscillating a light beam, in transforming the oscillations of said beam into corresponding electrical variations, in modulating high frequency currents in accordance with said variations, in transmitting said variations, in receiving and detecting said variations, and in controlling a cathode ray beam in accordance with said detected variations.

10. In television employing means for scanning the view to be transmitted, the method of analyzing the view preparatory to transmission comprising producing electrical effects, each capable by itself of inducing a different mechanical motion in the scanning means, utilizing said effects to impart to the scanning means a compound motion which is the resultant of the separate electrical effects, to scan the view, and translating the intensity of light from the various desired elementary portions of said view into electrical variations for transmission.

11. In television, the method of analyzing and reproducing the picture of an object, which consists in generating oscillations of a single frequency and of a varying amplitude, in scanning the object in accordance with said oscillations, in transforming the light from the desired elementary portions of the object into electrical fluctuations, and in varying a pencil of rays in accordance with said fluctuations.

12. In a television, the method of analyzing an image to be transmitted which consists in causing a scanning device to scan all of the elements of said image successively over a continuous spiral path.

13. The method of television, which consists in scanning an object along a uniform spiral path, in transforming the light from each element of said path into an electrical impulse, and varying a pencil of rays in accordance with said impulses.

14. The method of television, which consists in scanning an object along a diminishing continuous spiral path, in transforming the light from each element of said path into electrical impulses, and varying a pencil of rays in accordance with said impulses.

15. The method of transmitting pictures of objects, which consists in scanning the elementary patches of the picture, in transforming the light from said patches into corresponding electrical variations, in modulating high frequency currents in accordance with said variations, and in transmitting and detecting said modulated currents and generating a pencil of rays varying in intensity in accordance with said electrical variations.

16. In a system of television, a scanning element having two degrees of freedom, and means causing said element to periodically execute oscillations of each of its possible modes of motion.

17. In a system of television, a scanning element having two degrees of freedom, and means causing said element to periodically execute damped oscillations of each of its modes of motion.

18. In a system of television, a scanning element having two degrees of freedom, and means causing said element to periodically execute damped oscillations of the same frequency in each of its possible modes of motion.

19. In a system of television, a scanning element having two degrees of freedom, and means causing said element to execute oscillations of the same frequency in each of its modes of motion, the oscillations of one mode being 90° out of phase with the oscillations of the other mode.

20. In a system of television, a single scanning element, means causing said element to scan the entire area of an image to be transmitted over a continuous path, and means controlled by said scanning element for transmitting energy in accordance with the characteristics of said image.

21. In a system of television, a single scanning element, means causing said element to scan the entire area of an image to be transmitted over a continuous path, and means controlled by the motion of said scanning element for transmitting energy varying in accordance with the characteristics of said image.

22. In a system of television, a unitary scanning element adapted to scan an image to be transmitted, and means controlled thereby for producing two sets of energy variations, one set corresponding to the light intensity characteristics of the elements of said image, and the other set corresponding to the position characteristics of said elements.

23. In a system of television, a mirror mounted on two crossing supports, and means for causing said supports to oscillate at the same frequency.

24. In a system of television, a mirror mounted on two crossing supports, and means for causing said supports to oscillate at the same frequency with an oscillation phase difference of 90°.

25. In a system of television, a scanning element, two oscillatory crossing supports upon which said element is supported, means causing one of said supports to oscillate at a frequency the same as and at an amplitude proportional to that of a given oscillating current, and causing the other of said supports to undergo similar oscillations.

26. In a system for television, a single mirror, means for causing said single mirror to scan the subject whose image is to be transmitted, means for transforming the light received by said single mirror from the subject into corresponding electrical impulses, transmitting terminals, and means for impressing said impulses upon said terminals.

27. In a system for the transmission of pictures of objects, means for scanning the object whose image is to be transmitted, means for transforming the light received by said scanning means from the elementary portions of the subject into electrical impulses, a source of high frequency oscillations, means for modulating said high frequency oscillations in accordance with said impulses, transmitting terminals, means for impressing said modulated oscillations upon said terminals, a receiving station comprising means for receiving and detecting said modulated oscillations, and means for reproducing the picture of the subject in accordance with said detected oscillations.

28. In a system for the transmission of pictures of objects, means for scanning the object whose image is to be transmitted, means for transforming the light received by said scanning means from the elementary portions of the subject into electrical impulses, means associated with said scanning means for transforming the movements of said scanning means into corresponding electrical variations, a source of high frequency oscillations, means for modulating said high frequency oscillations in accordance with said electrical impulses and said variations, transmitting terminals, means for impressing said modulated oscillations upon said terminals, a receiving station comprising means for receiving and detecting said modulated oscillations, a source of rays, means for varying the intensity of said rays in accordance with the electrical impulses resulting from said detected oscillations, and means for deflecting said rays in accordance with the electrical variations resulting from the detected oscillations.

29. In a system for television, a single mirror adapted to scan the subject whose image is to be transmitted, means for causing said single mirror to scan the subject in a predetermined path periodically repeated, means associated with said single mirror for transforming its angular movements into corresponding electrical variations, means for transforming the light received by said single mirror from the elementary portions of the subject into corresponding electrical impulses, a source of rays, means for varying the intensity of the rays from said source in accordance with said electrical impulses, and means for deflecting said rays in accordance with said electrical variations.

30. In a system for television, means for intermittently illuminating the subject whose image is to be transmitted, a mirror, means for causing said mirror to scan the subject in a predetermined path periodically repeated, means associated with said mirror for transforming its angular movements into corresponding electrical variations, means for transforming the light received by said mirror from the elementary portions of said subject into corresponding electrical impulses, a source of rays, means for varying the intensity of the rays from said source in accordance with said electrical impulses, and means for deflecting said rays in accordance with said electrical variations.

31. In a system for television, a mirror adapted to scan the subject whose image is to be transmitted, means for causing said mirror to scan the subject in a predetermined path periodically repeated, means adapted to cause part of the illumination of the subject to be intermittent in character, means associated with said mirror for transforming its angular movements into corresponding electrical variations, means for transforming the light received by said mirror from the elementary portions of the subject into corresponding electrical impulses, a source of rays, means for varying the intensity of the rays from said source in accordance with said electrical impulses, and means for deflecting said rays in accordance with said electrical variations.

32. In a system for television, a mirror adapted to scan the subject whose image is to be transmitted, a source of oscillations of a single frequency and varying in amplitude, means for impressing said oscillations upon said mirror thereby causing corresponding angular movements of said mirror, means for illuminating the subject with an intermittency of a constant high frequency; means associated with said mirror for transforming its angular movements into corresponding electrical variations, means for transforming the light received by said mirror from the elementary portions of said subject into corresponding electrical impulses, a source of rays, means for varying in intensity the rays from said source in accordance with said electrical impulses, and means for deflecting said rays in accordance with said electrical variations.

33. In a system for television, a mirror adapted to scan the subject whose image is to be transmitted, means for causing said mirror to scan the subject along a path of variable velocity, means for compensating for the variations in said velocity, means for transforming the light received by said mirror from the subject into corresponding electrical impulses, transmitting terminals, and means for impressing said electrical impulses upon said terminals.

34. In a system for television, a mirror adapted to scan the subject whose image is to be transmitted, means for causing said mirror to scan the subject in a periodically repeated path of constant angular velocity but of variable linear velocity, means for compensating for the variations in said linear velocity, means associated with said mirror for transforming its angular movements into corresponding electrical variations, means for transforming the light received by said mirror from the elementary portions of the subject into corresponding electrical impulses, a source of rays, means for varying the intensity of the rays from said source in accordance with said electrical impulses, and means for deflecting said rays in accordance with said electrical variations.

35. In a system for television, a mirror adapted to scan the subject whose image is to be transmitted, means for causing said mirror to scan the subject along a spiral path of variable linear velocity, means associated with said mirror for transforming its angular movements into corresponding electrical variations, means for translating the light received by said mirror from the elementary portions of the subject into corresponding electrical impulses, means for varying the light received by said translating means from said mirror inversely as said variations in velocity, thereby compensating for said velocity variations, a source of rays, means for varying the intensity of the rays from said source in accordance with said electrical impulses, and means for deflecting said rays in accordance with said electrical variations.

36. In a system for television, a single mirror adapted to scan the subject whose image is to be transmitted, a source of oscillations of a single frequency and varying in amplitude, means for impressing said oscillations upon said mirror, thereby causing corresponding angular movements of said mirror, means associated with said mirror for transforming its angular movements into corresponding electrical variations, means for transforming the light received by said mirror from the elementary portions of said subject into corresponding electrical impulses, a source of rays, means for varying in intensity the rays from said source in accordance with said electrical impulses, and means for deflecting said rays in accordance with said electrical variations.

37. In a system for television, a single mirror adapted to scan the subject whose image is to be transmitted, a source of oscillations of a single frequency periodically varying in amplitude from a maximum to a zero value, means for impressing said oscillations upon said mirror, thereby causing corresponding angular movements of said mirror, means associated with said single mirror for transforming its angular movements into corresponding electrical variations, means for transforming the light received by said single mirror from the elementary portions of the subject into corresponding electrical impulses, a vacuum tube having a thermionic discharge, means for varying the intensity of said discharge in accordance with said electrical impulses, and means for deflecting said discharge in accordance with said electrical variations.

38. In a system for the transmission of pictures of moving objects, a sending station and a receiving station, said sending station comprising a single mirror adapted to scan the subject whose image is to be transmitted, means for causing said mirror to scan the subject in a spiral path, means associated with said mirror for transforming its movements into corresponding electrical variations, means for transforming the light received by said mirror from the elementary portions of the subject into electrical impulses, said receiving station comprising a cathode ray tube, means for varying the intensity of the cathode ray beam in accordance with said electrical impulses, and means for deflecting said beam in accordance with said electrical variations.

39. In a system for television, a sending station comprising a single mirror adapted to scan the subject whose image is to be transmitted, means for causing said mirror to scan the subject in a predetermined path periodically repeated, means associated with said single mirror for transforming its angular movements into corresponding electrical variations, means for transforming the light received by said single mirror from the elementary portions of the subject into corresponding electrical impulses, a source of high frequency oscillations, means for modulating said oscillations in accordance with said electrical impulses and electrical variations, transmitting terminals, means for impressing said modulated oscillations upon said terminals, a receiving station comprising means for receiving and detecting said modulated oscillations, a cathode ray tube, means for varying the intensity of the cathode stream in accordance with the electrical impulses resulting from said detection, and means for analogously and synchronously deflecting the stream in accordance with the electrical variations resulting from said detection.

40. In a system for television, a sending station comprising a single mirror, a source of oscillations of a single frequency periodically varying in amplitude, means for causing said mirror to scan the subject whose image is to be transmitted along a path determined by said oscillations, means for transforming the light received by said mirror from the elementary portions of the subject into electrical impulses, means for transforming the angular variations of said mirror into similar electrical variations, a source of high frequency oscillations, means for modulating said high frequency oscillations in accordance with said electrical impulses and said electrical variations, transmitting terminals, means for impressing said modulated high frequency oscillations upon said terminals, a receiving station comprising means for detecting said modulated oscillations, a cathode ray tube, means for varying the intensity of the cathode stream in accordance with the electrical impulses from said detection, means for deflecting the stream in accordance with the electrical variations from said detection, thereby providing for analogy and synchronism between the pencil of light to said mirror from said subject at the sending station, and the cathode stream at the receiving station.

41. In a system for television, means for analyzing the object at the sending station, means for reproducing a picture of the object at the receiving station, means for synchronizing the two said means, said synchronizing means comprising a means responsive to light energy to vary its electrical characteristics and a source of voltage therefor, means whereby the current developed in said light responsive means varies analogously in proportion to the movements of said analyzing means, and means for controlling said reproducing means in accordance with said electrical variations.

42. In a system for television, a mirror, a cathode ray tube, said mirror being adapted to scan a desired object in a predetermined path, means for synchronously adjusting the cathode stream and the beam of light received by said mirror from the object, said means comprising a photo-electric cell having an anode and a cathode, a source of light of constant intensity, said constant light being reflected to the light sensitive cathode of said cell by said mirror, a source of voltage for said cell, means associated with said cell whereby the position of said reflected beam determines the intensity of the current in said cell, thereby giving rise to electrical variations analogous and synchronous with the mechanical variations of said mirror, and means for deflecting said cathode beam in accordance with said variations.

43. In a system for television, a mirror, a cathode ray tube and a fluorescent screen adapted to reproduce the picture of the object, means for analogously and synchronously controlling the cathode beam and the beam of light to said mirror from the elementary portions of the object, said means consisting of means for impressing upon said mirror two oscillations of the same frequency but differing in phase and having an amplitude varying from a maximum to a zero value, means for creating electrical impulses the intensity of which is dependent upon and varies with the element of the object the mirror is scanning at every instant of time. two electrical means at right angles to each other adapted to deflect said cathode beam, and means for controlling both of said electrical means by said electrical impulses.

44. In a transmitting apparatus for television, a single mirror adapted to receive light from the object whose image is to be transmitted, a source of oscillations of a single frequency and a variable amplitude, means for impressing said oscillations upon said mirror whereby said mirror is constrained to scan the object in a predetermined path, means for transforming the vibrations of said mirror into electrical variations corresponding in intensity at every instant of time to the position of said mirror, means for translating the light received from the desired elementary portions of the object into electrical impulses, means for amplifying said impulses without distortion, transmitting terminals, and means for impressing said electrical variations and said amplified impulses upon said terminals.

45. In a transmitting apparatus for television, a magnetic field, a single mirror having supporting means in said field, said mirror being adapted to receive light from the object whose image is to be transmitted, a source of oscillations of a constant single frequency and of a variable amplitude, means for impressing said oscillations upon said supporting means, thereby vibrating said mirror in accordance with said oscillations and causing said mirror to scan said object along a predetermined path, means for transforming the vibrations of said mirror into electrical variations corresponding in intensity at every instant of time to the position of said mirror, means for transforming the light received by said mirror from each element scanned into electrical impulses varying at every instant of time according to said received light, means for amplifying said impulses without distortion, transmitting terminals, and means for impressing said variations and said amplified impulses upon said terminals.

46. In a transmitting apparatus for television, a single mirror adapted to scan the subject whose image is to be transmitted, a source of oscillations of a single frequency and of a variable amplitude, means for constraining said mirror to scan said subject in a path determined by said oscillations, a photo-electric cell adapted to receive light from the elements of said subject by said mirror and to transform said rceived light into corresponding electrical impulses, a source of light of constant intensity, a second photo-electric cell adapted to receive light reflected by said mirror from said light source, means associated with said second photo-electric cell for varying the current derived therefrom in accordance with the position of the reflected beam from said mirror, thereby giving rise to electrical variations in synchronism with the mechanical variations of said mirror, transmitting terminals, and means for impressing said electrical impulses and said electrical variations upon said terminals.

47. In a transmitting apparatus for television, a magnetic field, a single mirror having supporting means in said field, said mirror being adapted to receive light from the subject whose image is to be transmitted, a source of oscillations of a constant single frequency and of an amplitude varying from a maximum to a zero value, means for impressing said oscillations upon said supporting means, thereby vibrating said mirror in accordance with said oscillations and causing said mirror to scan said object along a predetermined path, a photo-electric cell adapted to receive the light from the elements of said subject by said mirror and to transform said received light into corresponding electrical impulses, a source of light of constant intensity, a photo-electric cell adapted to receive the light reflected by said mirror from said light source, an auxiliary electrode in said photo-electric cell whereby the current derived from said cell is varied in accordance with the position of the reflected beam from said mirror, thereby giving rise to electrical variations in synchronism with the mechanical variations of said mirror, transmitting terminals, and means for impressing said electrical impulses and said electrical variations upon said terminals.

48. In an apparatus for transmitting luminous pictures, a synchronizing means comprising a single oscillating means for receiving luminous rays from the desired elements of a picture, a source of light of constant intensity, a transmitting circuit comprising a light sensitive substance and a source of current therefor, said light sensitive substance being adapted to receive light, from said source, and means associated with said light sensitive substance whereby the electrical impulses produced in said transmitting circuit are varied in intensity according to the relative position of said light beam upon said substance.

49. In a system for the transmission of pictures of objects, a single mirror adapted to scan the desired elements of the objects whose image is to be transmitted, a source of oscillations periodically varying in amplitude from a maximum to a zero value, means for oscillating said mirror in accordance with said oscillations, a source of light of constant intensity, a transmitting circuit comprising a photo-electric cell and a source of current therefor, said cell being adapted to reecive light from said source reflected by said mirror, means associated with said cell for varying in intensity the electrical impulses produced by said constant light upon said cell in accordance with the position of said constant light on said cell, and means for transmitting said impulses.

50. In a system for the transmission of pictures of objects, a single mirror, a source of oscillations of a single frequency having a linear decrement, means for transforming said oscillations into two mechanical oscillations differing in phase, means for impressing said mechanical oscillations upon said mirror at right angles to each other, whereby said mirror is constrained to oscillate in a spiral path, a source of light of constant intensity, a transmitting circuit comprising a photo-electric cell and a source of current therefor, said mirror being adapted to reflect light from said source to said cell, whereby the point where said beam strikes said cell is determined at every instant of time by the oscillations of said mirror, and means associated with said cell whereby the electrical impulses generated by said cell depend in intensity upon the point where said beam strikes said cell, thereby producing electrical impulses varying in accordance with the oscillations of said mirror.

51. In a system for the transmission of pictures, a source of electrical oscillations of a single frequency, a source of oscillations of the same frequency but of different phase than the oscillations from said first source, means for receiving successively the light from the desired elementary portions of the object and for transforming said light into corresponding electrical impulses; said means comprising a single oscillating means constrained to oscillate by electrical impulses from the two said sources, and an electric circuit comprising a light sensitive substance and a source of current therefor.

52. In a system for the transmission of pictures, means for producing a field of force, a mirror having supporting means adapted to be controlled by said first means, said mirror being adapted to scan the object to be reproduced, a source of oscillations of a constant frequency but varying in amplitude in a predetermined manner, a second source of oscillations of the same frequency as the oscillations from said first source but differing in phase therefrom, means for impressing said oscillations upon said supporting means at points at right angles to each other, whereby said mirror is constrained to scan the elementary points of said object along a spiral path, a transmitting circuit comprising a photo-electric cell and a source of current therefor, said cell being adapted to receive light from said object by said mirror, said photo-electric cell providing means for transforming the light received from each elementary point of said object into corresponding electrical impulses, means for amplifying said impulses without distortion, and means for efficiently transmitting said amplified impulses.

53. In a system for the transmission of pictures, means for producing a field of force, a mirror having supporting means adapted to be controlled by said first means, said mirror being adapted to scan the object to be reproduced, a source of oscillations, means for periodically varying the amplitude of said oscillations from a maximum to a zero value, means for producing oscillations differing in phase by ninety degrees from said first oscillations, means for impressing the oscillations of one phase upon said supporting means, means for impressing oscillations of the other phase upon said supporting means at a point ninety degrees away from the point of application of said first oscillations, whereby said mirror is constrained to scan the elements of the object to be reproduced along a spiral path, a transmitting circuit comprising a photo-electric cell, said cell being adapted to receive light from said object by said mirror, said photo-electric cell providing means for transforming the light received from each elementary point of the object into corresponding electrical impulses, means for amplifying said impulses without distortion, and means for efficiently transmitting said amplified impulses.

54. In a system for television, a transmitting station and a receiving station, a source of analyzing currents at said transmitting station, means for transmitting said currents to said receiving station, a source of rays at said latter station, means for moving said rays over a suitable field, and means for causing said currents to vary the generation of said rays.

55. In a system for television, a transmitting station and a receiving station, a source of analyzing current fluctuations at said transmitting station, means for transmitting said fluctuations to said receiving station, an evacuated vessel at the latter station having an electron-emitting cathode, an anode and a control electrode, means for moving the electron discharge from said cathode over a suitable field, and means for impressing said fluctuations upon said control electrode to vary the intensity of said discharge.

56. In a system for television, a transmitting station and a receiving station, a source of anlyzing currents at said transmitting station, means for transmitting said analyzing currents to said receiving station, an evacuated vessel at this latter station having an electron-emitting cathode and an anode, means for moving the electron discharge from said cathode over a suitable field, and means for varying the electron flow between said cathode and anode, thereby varying the flow to said field.

57. In a system for the transmission of pictures, a source of analyzing currents at the transmitting station, a source of high frequency oscillations, means for modulating said high frequency oscillations in accordance with said analyzing currents, means for transmitting said modulated oscillations to a receiving station, means at this latter station for detecting said modulated high frequency oscillations, a source of rays, means for moving the rays from said source over a suitable field, and means for varying the emission of said rays from said source in accordance with said detected currents.

58. In a system for the transmission of pictures, a source of analyzing currents at the transmitting station, means for transmitting said analyzing currents to a receiving station, a source of rays, means for moving the rays from said source over a suitable field in a spiral path, and means for varying the generation of said rays in accordance with said analyzing currents.

59. In a system for the transmission of pictures, a transmitting station having a source of analyzing currents and a source of synchronizing currents, said synchronizing currents consisting of oscillations of a single frequency, means for transmitting said currents to a receiving station, a source of rays at the latter station, means whereby said rays are moved in a spiral path over a suitable field by said synchronizing currents, and means for varying the intensity of said source in accordance with said analyzing currents.

60. In a system for the transmission of pictures, a transmitting station having a source of analyzing currents and a source of synchronizing currents, said synchronizing currents consisting of oscillations of a single frequency, a source of high frequency oscillations, means for modulating said high frequency oscillations in accordance with said synchronizing currents and said analyzing currents, means for transmitting said modulated high frequency oscillations to a receiving station, means at said latter station for detecting said modulated oscillations thereby producing synchronizing currents and analyzing currents, means for amplifying said currents without distortion, a source of rays, means for deflecting the rays from said source along a spiral path in accordance with said detected synchronizing currents, and means for varying the intensity of said rays in accordance with said analyzing currents.

61. In a system for the transmission of pictures, a transmitting station having a source of analyzing currents, a source of synchronizing currents, said synchronizing currents consisting of oscillations of a single frequency, means for transmitting said currents to a receiving station, a source of a pencil of cathode rays at the receiving station, said pencil being surrounded by two pairs of plates at right angles to each other, means for impressing said synchronizing currents upon one of said pairs, means for causing said synchronizing currents to produce oscillations of the same frequency but differing in phase by ninety degrees from said synchronizing currents, means for impressing said oscillations having a phase lag upon said second pair, whereby said pencil is constrained to pass over a suitable field along a spiral path, and means for varying the intensity of said pencil in accordance with said analyzing currents, thereby producing the picture of the original object.

62. A photoelectric cell comprising a cathode adapted to be rendered active by a beam of light, an anode, a source of current connected to said cathode and anode, and means causing the value of the current set up by said beam of light striking the cathode, to vary in accordance with the position of the point of incidence of said beam.

63. A photoelectric cell having an apertured cathode, a controlling element extending through an aperture of said cathode, an anode, a source of electric current connected to said cathode and anode, and means causing the current flow between said cathode and anode to vary in accordance with the distance from said controlling element, of the point of incidence upon said cathode of a beam of light.

64. In a system of television, an object screen, means for throwing a beam of energy upon said screen, and means causing the beam of energy to traverse the entire surface of said screen in a continuous spiral path.

65. A system of television, an object screen, means for throwing a beam of energy upon said screen, means causing the beam of energy to traverse the entire surface of said screen in a continuous spiral path, and means for varying the intensity of said beam in accordance with an electric current.

66. The method of image transmission which comprises scanning, over a uniform continuous path, the entire image to be transmitted.

67. The method of image transmission which comprises causing light to fall upon a moving scanning element to affect a light responsive device in accordance with the position of said scanning element and causing light from an elementary image to fall upon the same scanning element to identify the position of the scanning element with respect to the elementary image.

68. An electron discharge device comprising a cathode, a perforated anode and a target located behind said anode, means for causing an electron discharge from said cathode to said anode, and controlling means for regulating the intensity of said discharge whereby a portion of said discharge passing through said anode impinges upon said target to cause said target to emit a beam of energy.

69. An electron discharge device comprising a cathode, a perforated anode and a target located behind said anode, means for causing an electron discharge from said cathode to said anode, and controlling means for controlling the intensity of said discharge, whereby a portion of said discharge passing through said anode impinges upon said target to excite said target and cause it to emit corresponding varying energy.

70. A Braun tube comprising an electron discharge device having a cathode, anode and a target adapted to be rendered active by the action of an electron stream from said cathode, and means controlling the intensity of said electron stream.

71. A Braun tube comprising an electron discharge device having a cathode, an anode and a target adapted to be rendered active by the action of an electron stream, means for producing an electron discharge from said cathode to said anode, and means between said cathode and said anode for controlling the intensity of the electron stream.

72. A Braun tube comprising electrodes, means for causing an electron discharge between said electrodes, a target adapted to be rendered luminous by the action of said discharge, and means for varying the intensity of said discharge and means for causing the position of the action of said discharge upon said target to vary whereby luminous paths of varying light instensity may be produced.

73. A Braun tube comprising electrodes, means for causing an electron discharge between said electrodes, a target adapted to be rendered luminous by action of said discharge, and means for varying the intensity of said discharge to vary the intensity of the luminous spot while maintaining the position of the center of the spot unaffected by the intensity varying action.

In witness whereof, I hereunto subscribe my name this 27th day of November A. D., 1917.

ALEXANDER McLEAN NICOLSON.